(12) United States Patent
Wang et al.

(10) Patent No.: US 10,887,569 B2
(45) Date of Patent: Jan. 5, 2021

(54) VIRTUAL VIEWPOINT SYNTHESIS METHOD BASED ON LOCAL IMAGE SEGMENTATION

(71) Applicant: PEKING UNIVERSITY SHENZHEN GRADUATE SCHOOL, Shenzhen (CN)

(72) Inventors: Ronggang Wang, Shenzhen (CN); Xiubao Jiang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/489,209

(22) PCT Filed: Aug. 14, 2017

(86) PCT No.: PCT/CN2017/097358
§ 371 (c)(1),
(2) Date: Oct. 24, 2019

(87) PCT Pub. No.: WO2018/157562
PCT Pub. Date: Sep. 7, 2018

(65) Prior Publication Data
US 2020/0099911 A1    Mar. 26, 2020

(30) Foreign Application Priority Data
Feb. 28, 2017    (CN) .......................... 2017 1 0113048

(51) Int. Cl.
*H04N 13/111*    (2018.01)
*G06T 7/194*    (2017.01)
(Continued)

(52) U.S. Cl.
CPC ............ *H04N 13/111* (2018.05); *G06T 5/002* (2013.01); *G06T 7/174* (2017.01); *G06T 7/194* (2017.01);
(Continued)

(58) Field of Classification Search
None
See application file for complete search history.

(56) References Cited

U.S. PATENT DOCUMENTS 8,737,723 B1 * 5/2014 Kwatra ................. G06T 15/205
                                                              382/154
9,838,663 B2    12/2017 Li et al.
(Continued)

FOREIGN PATENT DOCUMENTS

CN    101720047 A    6/2010
CN    104574342 A    4/2015
(Continued)

OTHER PUBLICATIONS

Zhu et al., Reliability Fusion of Time-of-Flight Depth and Stereo Geometry for High Quality Depth Maps, Jul. 2011, IEEE Transactions on Pattern Analysis and Machine Intelligence, vol. 33, No. 7, pp. 1400-1413 (year 2011).

*Primary Examiner* — Frank S Chen
(74) *Attorney, Agent, or Firm* — Miles & Stockbridge P.C.

(57) ABSTRACT

Disclosed is a virtual viewpoint synthesis method based on image local segmentation, which relates to the digital image processing technology. By mapping the input left and right images to the virtual viewpoints so as to be fused to obtain a synthesized image, smoothing and denoising the rough and noisy depth maps based on the object segmentation information of the scene, the method as disclosed solves the occlusion issue through local area segmentation during the process of viewpoint synthesis, which may guarantee that (Continued)

the subjective quality of viewpoint synthesis will not be significantly deteriorated when the depth map has a relatively large flaw, and maintain geometric information of the scene to the utmost extent so as to generate a real immersive sense, thereby ameliorating the drawback of significant deterioration of synthesis quality in conventional methods when the depth information of the scene has errors and noises, and offering a relatively strong robustness to the errors in the depth map information of the scene. The disclosed method may be applied to a video surveillance system and image processing software, etc.

6 Claims, 2 Drawing Sheets

(51) Int. Cl.
  *G06T 7/174*    (2017.01)
  *G06T 7/593*    (2017.01)
  *H04N 13/15*    (2018.01)
  *H04N 13/156*   (2018.01)
  *H04N 13/122*   (2018.01)
  *G06T 5/00*     (2006.01)
  *H04N 13/00*    (2018.01)
(52) U.S. Cl.
  CPC .......... *G06T 7/593* (2017.01); *H04N 13/122* (2018.05); *H04N 13/15* (2018.05); *H04N 13/156* (2018.05); *G06T 2207/30232* (2013.01); *H04N 2013/0081* (2013.01)

(56) References Cited

U.S. PATENT DOCUMENTS

| | | | |
|---|---|---|---|
| 2005/0232510 A1* | 10/2005 | Blake | G06T 7/593 382/275 |
| 2011/0285813 A1* | 11/2011 | Girdzijauskas | H04N 13/243 348/42 |
| 2012/0120185 A1* | 5/2012 | Zhao | H04N 7/144 348/14.16 |
| 2012/0206442 A1 | 8/2012 | Tian et al. | |
| 2012/0249750 A1* | 10/2012 | Izzat | H04N 13/144 348/47 |
| 2014/0270706 A1* | 9/2014 | Pasko | H04N 21/41407 386/278 |
| 2015/0043636 A1* | 2/2015 | Jung | H04N 19/59 375/240.12 |
| 2015/0178936 A1 | 6/2015 | Boisson et al. | |
| 2018/0091798 A1* | 3/2018 | Chang | H04N 13/271 |
| 2020/0162719 A1 | 5/2020 | Tadi et al. | |

FOREIGN PATENT DOCUMENTS

| | | |
|---|---|---|
| CN | 104756489 A | 7/2015 |
| CN | 106210696 A | 12/2016 |
| EP | 2860695 A1 | 4/2015 |

* cited by examiner (a)          (b)          (c)

VIRTUAL VIEWPOINT SYNTHESIS METHOD BASED ON LOCAL IMAGE SEGMENTATION

FIELD

Embodiments of the present disclosure relate to the field of digital image processing, specifically relate to an image enhancement method, and more particularly relate to a method for performing virtual viewpoint synthesis by local area segmentation of an image, which may be applied to a video surveillance system and image processing software, etc.

BACKGROUND

With development of corresponding hardware markets, the naked-eye three-dimensional technology (3D) and the virtual reality technology have become popular in a wide array. Compared with conventional media, these novel media may provide a stronger immersive experience to users. However, acquisition devices matching the novel media have not emerged yet. With the naked-eye 3D as an example, most of the naked-eye 3D TVs available in the market generally require multi-channel (8/9/27/64) viewpoint inputs; with fewer cameras, existing real viewpoints need to be extended so as to capture naked eye 3D contents, e.g., synthesizing the contents captured by two channels of stereo cameras into an 8-channel video stream. This technology of synthesizing some virtual viewpoints surrounding known viewpoints based on contents of the known viewpoints and scene depth information is referred to as the virtual viewpoint synthesis technology.

The conventional virtual viewpoint synthesis method is a virtual viewpoint synthesis technology based on a dense depth map. This method heavily relies on the accuracy of the depth map; and the noises and errors in the depth map greatly affect the quality of the synthesized viewpoint. Further, acquisition of the depth map is always limited by texture complexity of a scene and whether there exists a non-diffuse reflective object, such that the depth map cannot be very accurate. Therefore, the conventional virtual viewpoint synthesis method is not robust enough to the errors in the depth map, causing significant deterioration of the subjective quality of viewpoint synthesis when the depth map has a relatively large flaw, which makes it hard to maintain geographic information of the scene to generate a real immersive sense.

SUMMARY

To overcome the drawbacks in the prior art, the present disclosure provides a virtual viewpoint synthesis method based on image local segmentation, which may guarantee that the subjective quality of viewpoint synthesis will not be significantly deteriorated when the depth map has a relatively large flaw, and maintain geometric information of the scene to the utmost extent so as to generate a real immersive sense, thereby ameliorating the drawback of significant deterioration of synthesis quality in conventional methods when the depth information of the scene has errors and noises, and offering a relatively strong robustness to the errors in the depth map information of the scene.

A technical solution of the present disclosure is provided below:

a virtual viewpoint synthesis method based on image local segmentation, wherein left and right images inputted are mapped to virtual viewpoints so as to be fused to obtain a synthesized image; smoothing and denoising are performed to a rough and noisy depth map based on object segmentation information of the scene; besides, the occlusion issue is solved by segmentation of local areas during the viewpoint synthesis process, thereby offering a relatively strong robustness to errors in the depth information of the scene; wherein the method comprises steps of:

Step 1: performing stereo matching to input left and right images and denoising:

First, an initial disparity map is obtained by using a stereo matching algorithm SGM (Semi Global Matching). The resultant disparity maps of the left and right viewpoints are subjected to left and right consistency test and ratio test, wherein the disparity at each pixel position is correspondingly labelled as "reliable," "unreliable," or "occluded," while those disparities labeled "occluded" may be replaced by surrounding background disparities.

Step 2: segmenting the initial disparity map into regular meshes to perform downsampling; those disparities labeled "unreliable" in the resultant disparity map are replaced with color information of the scene; specifically, the disparity map is first segmented into regular meshes, and the color information surrounding each lattice point is recorded using an LAB color histogram. For those lattice points surrounded by reliable disparities within a certain scope, they are subjected to plane fitting to estimate a disparity. For lattice points surrounded only by unreliable depth, lattice points with the highest likelihood to be located on a same object are resolved on the regular mesh using the dynamic planning algorithm, and then the former lattice points are replaced with the depths of the latter lattices.

Step 3: for each rectangular mesh on the disparity map, determining whether depth discontinuity exists in the mesh based on disparity information at the four corner points of the rectangular mesh;

Because content of the rectangular mesh on the depth discontinuity will generate an occlusion on the newly synthesized viewpoint, it is needed to segment the mesh into a foreground object and a background object so as to map them separately. Based on the disparity information at the four corner points, the to-be-segmented mesh may be segmented by "transverse segmentation," "longitudinal segmentation," or "diagonal segmentation," as a basis for determining the start edge and the end edge of the segmentation line. The issue of seeking for a segmentation line may be correspondingly converted to the issue of seeking for the shortest path from the start edge to the end edge in the mesh, wherein the shortest path issue is resolved through dynamic planning.

Step 4: mapping the input left and right images to the virtual viewpoint so as to be fused into a synthetic image.

For a rectangular grid without depth discontinuity inside, it may be directly mapped onto the virtual viewpoint through the disparity information on the corner points; for a rectangular mesh with depth discontinuity inside, it may be segmented into two parts along the segmentation line, and then the two parts are separately mapped onto the virtual viewpoint based on the disparity between the foreground and the background. The synthesized virtual viewpoint needs to maintain a disparity buffer zone z-buffer, i.e., at each pixel point, a disparity corresponding to the pixel mapped to the position needs to be recorded, and a pixel with a higher disparity value may occlude the pixel with a lower disparity value.

Through the steps above, an image synthesized by the virtual viewpoints is obtained.

Compared with the prior art, the present disclosure has the following beneficial effects:

The present disclosure provides a virtual viewpoint synthesis method based on image local segmentation, which may guarantee that the subjective quality of viewpoint synthesis will not be significantly deteriorated when the depth map has a relatively large flaw, and maintain geometric information of the scene to the utmost extent so as to generate a real immersive experience, thereby ameliorating the drawback of significant deterioration in synthesis quality in conventional methods when the depth information of the scene has errors and noises, and offering a relatively strong robustness to the errors in the depth map information of the scene. The present disclosure has the following advantages:

1. improving the depth map-based viewpoint synthesis, smoothing and denoising the noise-contained depth map based on the texture and segmentation information of the scene, and reducing the impact of depth estimation noise on viewpoint synthesis quality;

2. improving the integrity of disparity map by replacing unreliable disparities with reliable ones in the disparity map based on the color information and geometric location information of the scene;

3. solving the occlusion issue in virtual viewpoint synthesis by segmenting the depth discontinuity-contained local area in the image based on the depth and color information of the scene.

wherein (a) shows a synthesis result of an image domain deformation-based virtual viewpoint synthesis method; (b) shows a synthesis result of the depth map-based viewpoint synthesis method; (c) shows a result of performing virtual viewpoint synthesis using the virtual viewpoint synthesis method provided by the present disclosure.

DETAILED DESCRIPTION OF EMBODIMENTS

Hereinafter, the present disclosure is further described through the embodiments, but the scope of the present disclosure is not limited in any manner.

Figure 1:
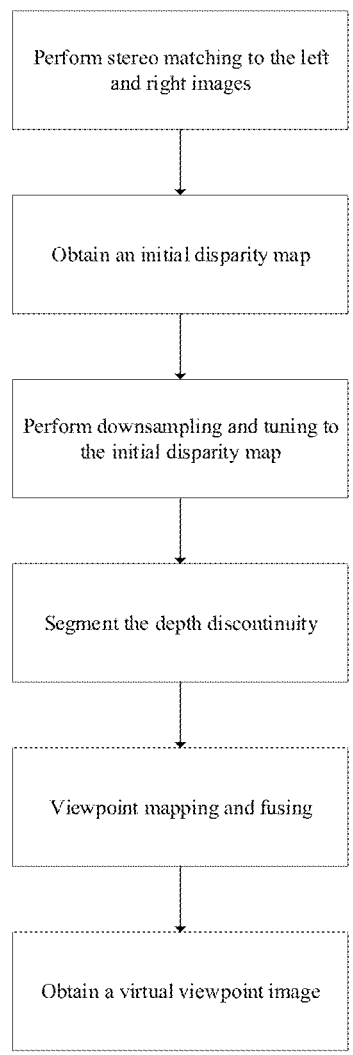
FIG. 1 shows a flow diagram of a virtual viewpoint synthesis method according to the present disclosure.

The present disclosure provides a virtual viewpoint synthesis method based on image local segmentation; wherein smoothing and denoising are performed to a rough and noisy depth map based on object segmentation information of the scene; besides, the occlusion issue is solved by local area segmentation during the viewpoint synthesis process, thereby obtaining the virtual viewpoint image. FIG. 1 shows a flow diagram of a virtual viewpoint synthesis method according to the present disclosure. The present disclosure has a relatively strong robustness to the errors in the scene depth information.

Figure 2:
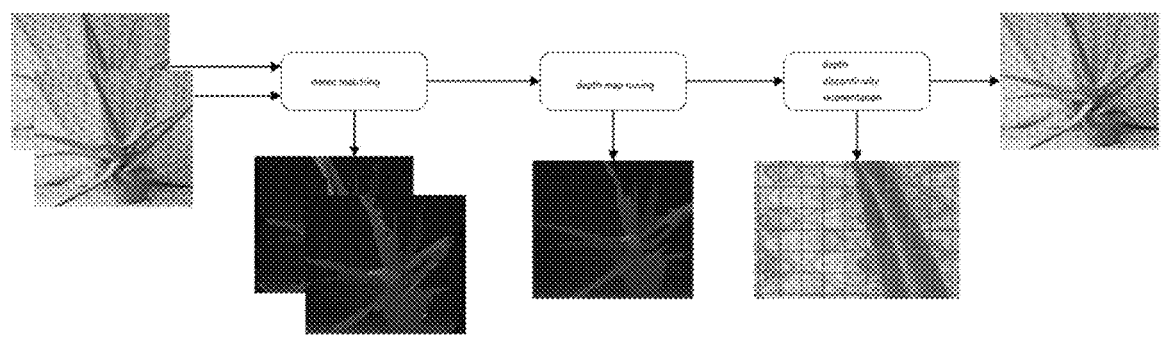
FIG. 2 shows a schematic diagram of the steps of virtual viewpoint synthesis according to an embodiment of the present disclosure.

FIG. 2 shows steps of performing virtual viewpoint synthesis according to an embodiment of the present disclosure. In the embodiment, the left and right images as inputted are a set of test pictures Aloe in the MiddleBury stereo matching dataset. First, the initial disparity map is obtained by stereo matching; the initial disparity map is subjected to downsampling and tuning to obtain a sparse disparity on regular meshes; all meshes with depth discontinuity are segmented; finally, the input left and right images are mapped to the virtual viewpoints which are fused to obtain a synthetic image. Specifically, the virtual viewpoint synthesis method comprises the following steps:

Step 1: performing stereo matching to the input left and right images and denoising. First, an initial disparity map is obtained by using an SGM (Semi Global Matching) stereo matching algorithm. The resultant disparity maps of the left and right viewpoints are subjected to left and right consistency test and ratio test.

Step 2: performing downsampling to the initial disparity map to obtain a sparse depth map. First, the disparity map is segmented into regular meshes, and then the sparse disparities at lattice-point positions are estimated; this step specifically includes two rounds.

In the first round, for the lattice point position (p,q), all reliable disparity values within the surrounding window of size $\Delta_x \times \Delta_y$ are captured to construct a disparity histogram H with a size of max_disparity+1. The disparity level with the highest quantity in H is denoted d*, where S is the total number of reliable disparities within the window. If the constraint condition expressed by equation 1 is satisfied, the current lattice point position is labeled "reliable":

$$S > \tau_1 \Delta_x \Delta_y, \; \frac{H(d^*)}{S} > \tau_2 \quad \text{(Equation 1)}$$

where the threshold values may be $\tau_1 = 0.5$; $\tau_2 = 0.8$.

The reliable disparity values surrounding the "reliable" lattice point are expressed by the set $M = \{x_i, y_i, d_i\}_{i=1}^{S}$; and the M is subjected to disparity plane fitting through equation 2:

$$\pi(x,y) = \pi_a x + \pi_b y + \pi_c \quad \text{(Equation 2)}$$

In equation 2, $\pi_a$, $\pi_b$, $\pi_c$ are coefficients for plane fitting.
The disparity value disp(p,q) of the current lattice point is thereby computed as:

$$\text{disp}(p,q) = \pi_a \Delta_x p + \pi_b \Delta_y q + \pi_c \quad \text{(Equation 3)}$$

wherein p and q are two neighboring nodes on the path.

In the second round, disparities of the lattice point positions without being labeled "reliable" (i.e., "unreliable lattice point positions") are estimated. Specifically, for each lattice point position, LAB color information (LAB is a color space) in its surrounding $\Delta_x + \Delta_y$ window is collected to construct a histogram. The current "unreliable" lattice point position is denoted as $N_s$; for all "reliable" lattice points $\{N_T^1, N_T^2 \ldots N_T^k\}$ within their surrounding W/6×H/6 T range, a path cost from $N_s$ to $\{N_T^1, N_T^2 \ldots N_T^k\}$ is calculated using the dynamic planning algorithm, wherein the path cost between two neighboring nodes is expressed as equation 4:

$$C(N_S \to N_T^j) = \min_{\gamma \in \text{all paths connecting } N_S \text{ and } N_T^j} C(N_S \xrightarrow{\gamma} N_T^j) \quad \text{(Equation 4)}$$

$$C(N_S \xrightarrow{\gamma} N_T^j) = \sum_{i=1}^{|\gamma|-1} d(H_{Lab}(\gamma(i)), H_{Lab}(\gamma(i+1)))$$

where d(.,.) denotes a $\chi^2$ distance between two LAB histograms; γ represents a node along which a path passes, C(.,.) denotes a path cost between two nodes, and C̃(.,.) denotes a minimum cost among all paths between two nodes. The difference on the target node with the minimum cost among the paths is assigned to $N_s$.

Step 3: for each rectangular mesh, determining whether depth discontinuity exists in the mesh based on disparity information at the four corner points of the rectangular mesh. Because the content of the rectangular mesh on the depth discontinuity will generate an occlusion on the newly synthesized viewpoint, it is needed to segment the rectangular mesh into a foreground object and the background object so as to be mapped separately.

For a rectangular mesh $Q(p,q)$, disparity values $\{d_1, d_2, d_3, d_4\}$ on the four corner points are divided into subsets $S_1, S_2, S_k$ according to expression 5:

$$\text{for any } d_i, d_j \in S_k, |d_i - d_j| \leq 1$$

$$\text{for any } d_i \in S_k, d_j \notin S_k, |d_i - d_j| > 1 \quad \text{(Equation 5)}$$

where N denotes the total number of divided subsets; if N=1, it indicates that the mesh does not have depth discontinuity, such that it needn't be segmented. If N=2, it indicates that the mesh has depth discontinuity, such that it needs to be segmented. If N≥3, it indicates that the disparities at the corner points of the current mesh are not consistent, such that the current mesh is discarded. In the case of N=2, we may further divide the mesh by "transverse segmentation," "longitudinal segmentation," or "diagonal segmentation" based on disparity distribution of the corner points.

With the "transverse segmentation" as an example, the left and right vertical edges in the mesh are respectively denoted as the start edge and the end edge, such that the issue of seeking the segmentation line may be converted to the issue of solving a path with the minimum cost among all paths from a certain node on the start node to a certain node on the end node, wherein the cost between two nodes p, q on the path is defined as an edge strength on point p.

Step 4: for a rectangular network without depth discontinuity inside, it may be directly mapped onto the virtual viewpoint based on disparity information on the corner points. For a rectangular mesh with depth discontinuity inside, it may be divided into two portions along the segmentation line and then the two portions are respectively mapped to the virtual viewpoints based on foreground and background disparities; the occluded pixels are eliminated using the disparity buffer zone (z-buffer).

After the left and right disparity maps $I_L, I_R$ are subjected to the viewpoint mapping, respectively, the virtual viewpoint images obtained in equation 6 need to be fused to obtain the final synthesized viewpoint $I_M$:

$$I_M = (1-\alpha)I_L^\alpha + \alpha I_R^\alpha \quad \text{(Equation 6)}$$

where $0 < \alpha < 1$ denotes the normalized distance from the virtual viewpoint to the left viewpoint $I_L$; and $I_M$ denotes a final synthesized viewpoint; $I_L^\alpha, I_R^\alpha$ refer to images resulting from mapping $I_L$ and $I_R$ to the virtual viewpoint position. The specific synthesis effect is shown in FIG. 3.

Figure 3:
FIG. 3 shows comparison diagrams of the effects of virtual viewpoint synthesis in the embodiments of the present disclosure.

FIG. 3 shows the final output results of this embodiment; besides, the results obtained with the method of the present disclosure are compared with the traditional methods, as shown in FIG. 3, wherein (a) shows a synthesis result of an image domain deformation-based virtual viewpoint synthesis method; (b) shows a synthesis result of the depth map-based viewpoint synthesis method; (c) shows a result of performing virtual viewpoint synthesis using the virtual viewpoint synthesis method provided by the present disclosure. FIG. 3 indicates that the method of the present disclosure may effectively reduce the defects in the traditional synthesis methods.

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. A virtual viewpoint synthesis method based on image local segmentation, wherein input left and right images are mapped to virtual viewpoints so as to be fused to obtain a synthesized image, comprising steps of:
    Step 1: performing stereo matching to the input left and right images and denoising to obtain an initial disparity map; subjecting the resultant disparity maps of the left and right viewpoints to left and right consistency test and ratio test, wherein the disparity of each pixel position is correspondingly labelled as "reliable," "unreliable," or "occluded";
    Step 2: performing downsampling to the initial disparity map; segmenting the disparity map into regular meshes; and estimating sparse disparities at lattice point positions;
    Step 3: for each rectangular mesh on the disparity map, determining whether depth discontinuity exists in the mesh based on disparity information at the four corner points of the rectangular mesh;
    Step 4: for a rectangular grid without depth discontinuity inside, directly mapping, without segmenting, it to the virtual viewpoint through the disparity information on the corner points; for a rectangular mesh with depth discontinuity inside, segmenting it and mapping it to the virtual viewpoint based on foreground disparity and background disparity; and maintaining a disparity buffer zone for recording the disparity of the corresponding pixel mapped to respective pixel position;
    Step 5: fusing the virtual viewpoint image obtained after viewpoint mapping to obtain the final synthesized viewpoint image.

2. The synthesis method according to claim 1, wherein in the first step, stereo matching is performed using the stereo matching algorithm Semi Global Matching SGM to obtain an initial disparity map.

3. The synthesis method according to claim 1, wherein the second step of sparse disparities at lattice point positions specifically includes a first round of estimation and a second round of estimation:
    in the first round of estimation, for the lattice point position (p,q), all reliable disparity values within the surrounding window of size $\Delta_x \times \Delta_y$ are captured to construct a disparity histogram H with a size of max_disparity+1; the disparity level with the highest quantity in H is denoted as d*, where S is the total number of reliability disparities within the window; if the constraint condition expressed by equation 1 is satisfied, the current lattice point position is labeled "reliable":

$$S > \tau_1 \Delta_x \Delta_y, \quad \frac{H(d^*)}{S} > \tau_2 \quad \text{(Equation 1)}$$

where $\tau_1$, $\tau_2$ are threshold parameters;

the reliable disparity values surrounding the "reliable" lattice point are expressed by the set $M=\{x_i,y_i,d_i\}_{i=}^{S}$; and the M is subjected to disparity plane fitting through equation 2:

$$\pi(x,y)=\pi_a x+\pi_b y+\pi_c \quad \text{(Equation 2)}$$

in equation 2, $\pi_a$, $\pi_b$, $\pi_c$ are coefficients for plane fitting;

the disparity value disp(p,q) of the current lattice point is computed through equation 3:

$$\text{disp}(p,q)=\pi_a\Delta_x p+\pi_b\Delta_y q+\pi_c \quad \text{(Equation 3)}$$

where p and q are two neighboring nodes on the path;

in the second round, disparities of the lattice point positions without being labeled "reliable" (i.e., "unreliable lattice point positions") are estimated; specifically, for each lattice point position, LAB color information (LAB is a color space) in its surrounding $\Delta_x \times \Delta_y$ window is collected to construct a histogram; the current "unreliable" lattice point position is denoted as $N_s$; for all "reliable" lattice points $\{N_T^1, N_T^2 \ldots N_T^k\}$ within the surrounding W/6×H/6 range, a path cost from $N_s$ to $\{N_T^1, N_T^2 \ldots N_T^k\}$ is calculated using a dynamic planning algorithm, wherein the path cost between two neighboring nodes is expressed as equation 4:

$$C(N_S \to N_T^j) = \min_{\gamma \in \text{all paths connecting } N_S \text{ and } N_T^j} \tilde{C}(N_S \xrightarrow{\gamma} N_T^j) \quad \text{(Equation 4)}$$

$$\tilde{C}(N_S \xrightarrow{\gamma} N_T^j) = \sum_{i=1}^{|\gamma|-1} d(H_{Lab}(\gamma(i)), H_{Lab}(\gamma(i+1)))$$

where $d(.,.)$ denotes $\chi^2$ distance between two LAB histograms; $\gamma$ represents a node through which a path passes, $C(.,.)$ denotes a path cost between two nodes, and $\tilde{C}(.,.)$ denotes a minimum cost among all paths between two nodes.

4. The synthesis method according to claim 1, wherein in step 3, whether the depth discontinuity exists in the mesh is determined through the following method:

for a rectangular grid Q(p,q), dividing the disparity values $\{d_1,d_2,d_3,d_4\}$ on the four corner points into subsets $S_1$, $S_2$, $S_k$ according to expression 5:

for any $d_i, d_j \in S_k, |d_i-d_j| \leq 1$ for any $d_i \in S_k, d_j \notin S_k, |d_i-d_j| > 1 \quad \text{(Equation 5)}$ wherein when the total number of divided subsets is equal to 1, it indicates that the mesh does not have depth discontinuity; when the total number of divided subsets is equal to 2, it indicates that the mesh has depth discontinuity; when the total number of divided subsets is equal to ≥3, it indicates that the disparities of the corner points of the current mesh are not consistent, such that the current mesh is discarded.

5. The synthesis method according to claim 1, wherein in step 4, the rectangular mesh with depth discontinuity inside is segmented; specifically, it may be segmented by transverse segmentation, longitudinal segmentation or diagonal segmentation based on disparity distributions at the corner points.

6. The synthesis method according to claim 1, wherein in step 5, the resultant virtual viewpoint images are fused through equation 6 to obtain the final synthesized viewpoint $I_M$:

$$I_M=(1-\alpha)I_L^\alpha+\alpha I_R^\alpha \quad \text{(Equation 6)}$$

where $0<\alpha<1$ denotes the normalized distance from the virtual viewpoint to the left viewpoint $I_L$; $I_M$ denotes a final to-be-synthesized viewpoint image; $I_L^\alpha, I_R^\alpha$ refer to the images resulting from mapping $I_L$, $I_R$ the virtual viewpoint positions.

* * * * *